(12) United States Patent
Sekiguchi

(10) Patent No.: US 10,871,472 B2
(45) Date of Patent: Dec. 22, 2020

(54) WELDING PORTION INSPECTION DEVICE

(71) Applicant: TOYOTA JIDOSHA KABUSHIKI KAISHA, Toyota (JP)

(72) Inventor: Takao Sekiguchi, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 229 days.

(21) Appl. No.: 15/893,945

(22) Filed: Feb. 12, 2018

(65) Prior Publication Data

US 2018/0238834 A1 Aug. 23, 2018

(30) Foreign Application Priority Data

Feb. 21, 2017 (JP) ................ 2017-029659

(51) Int. Cl.
*G01N 29/24* (2006.01)
*G01N 29/04* (2006.01)
*G01N 29/22* (2006.01)
*G01N 29/265* (2006.01)

(52) U.S. Cl.
CPC ....... *G01N 29/2437* (2013.01); *G01N 29/041* (2013.01); *G01N 29/043* (2013.01); *G01N 29/225* (2013.01); *G01N 29/265* (2013.01); *G01N 2291/106* (2013.01); *G01N 2291/2672* (2013.01)

(58) Field of Classification Search
CPC ............. G01N 29/2437; G01N 29/041; G01N 29/043; G01N 29/224; G01N 29/265
USPC .......................................................... 73/628
See application file for complete search history.

(56) References Cited

U.S. PATENT DOCUMENTS

| 1,242,744 | A | | 12/1980 | Rottmar |
| 5,095,753 | A | * | 3/1992 | Russ ............... G01N 29/223 |
| | | | | 73/598 |

(Continued)

FOREIGN PATENT DOCUMENTS

| JP | S58-158358 U | 10/1983 |
| JP | S59-088987 U | 6/1984 |

(Continued)

OTHER PUBLICATIONS

Jun. 25, 2019 Partial Translation of Japanese Office Action issued in Japanese Patent Application No. 2017-029659.

*Primary Examiner* — Tarun Sinha
(74) *Attorney, Agent, or Firm* — Oliff PLC

(57) ABSTRACT

A welding portion inspection device includes a device body, a probe, a sound propagation medium, an elastic support mechanism configured to allow the probe and the sound propagation medium to be elastically supported to the device body, and a guide member formed of a material higher in hardness than a metal plate. The guide member is disposed such that a first part is positioned on a side of the sound propagation medium and second parts protrude beyond a tip surface of the sound propagation medium. The probe is configured to oscillate a ultrasonic wave such that the ultrasonic wave is emitted to a welding portion of the metal plate through the sound propagation medium and perform inspection of the welding portion based on a detected reflected wave of the ultrasonic wave in a state where the tip surface of the sound propagation medium faces the welding portion.

9 Claims, 10 Drawing Sheets

(56) References Cited

U.S. PATENT DOCUMENTS

| | | | | |
|---|---|---|---|---|
| 6,588,278 B1 * | 7/2003 | Takishita | ............ | G01N 29/0645 |
| | | | | 73/609 |
| 2007/0239030 A1 * | 10/2007 | Prager | .................. | A61B 8/4281 |
| | | | | 600/472 |
| 2016/0061650 A1 * | 3/2016 | Sato | ....................... | G01H 9/008 |
| | | | | 73/655 |
| 2017/0276651 A1 * | 9/2017 | Hall | ....................... | G01B 17/02 |

FOREIGN PATENT DOCUMENTS

| | | |
|---|---|---|
| JP | S60-259953 A | 12/1985 |
| JP | S61-005464 U | 1/1986 |
| JP | 2005-106654 A | 4/2005 |
| JP | 2007-315935 A | 12/2007 |
| JP | 2013-022605 A | 2/2013 |

\* cited by examiner

WELDING PORTION INSPECTION DEVICE

INCORPORATION BY REFERENCE

The disclosure of Japanese Patent Application No. 2017-029659 filed on Feb. 21, 2017 including the specification, drawings and abstract is incorporated herein by reference in its entirety.

BACKGROUND

1. Technical Field

The present disclosure relates to a welding portion inspection device and, more particularly, to improving a welding portion inspection device for emitting an ultrasonic wave to a welding portion and performing inspection of the welding portion based on a reflected wave (a reflection echo) of the ultrasonic wave.

2. Description of Related Art

A welding portion inspection device using an ultrasonic wave is known in the related art as a device inspecting whether the welding quality of a spot welding portion of a vehicle body of a vehicle or the like is high or low. The welding portion inspection device emits an ultrasonic wave to the spot welding portion and inspects whether the welding quality of the spot welding portion is high or low based on a reflected wave of the ultrasonic wave (based on, for example, the intensity of the reflected wave and image data on the spot welding portion created from the reflected wave).

Japanese Unexamined Patent Application Publication No. 2013-022605 (JP 2013-022605 A) discloses a detector provided with an ultrasonic wave oscillating unit and supported to a floating mechanism in the welding portion inspection device described above. Specifically, JP 2013-022605 A discloses a configuration in which a coil spring is interposed between a fixed plate attached to an articulated robot and a movable plate to which the detector is attached. The floating mechanism elastically supporting the detector is realized in this manner. In other words, although the detector needs to perform abutting from the direction that is orthogonal to the surface of the spot welding portion for a high level of welding quality inspection accuracy to be obtained, the adoption of the floating mechanism allows the direction of the detector to be changed by the reaction force from the surface of the spot welding portion at a time when the detector abuts against the surface of the spot welding portion even in a case where the detector is inclined with respect to the surface of the spot welding portion, and thus the detector is capable of abutting from the direction that is orthogonal to the surface of the spot welding portion.

SUMMARY

In general, the detector in the welding portion inspection device has a configuration in which a shoe as a sound propagation medium is attached to the tip of a probe that is the ultrasonic wave oscillating unit and the above-described inspection of the welding quality is performed with the shoe abutting against the surface of the spot welding portion. The shoe is formed of a material that has excellent ultrasonic transmission properties such as an acrylic resin. As described above, the shoe is formed of a material lower in hardness than a spot-welded metal plate (steel plate).

Accordingly, the tip surface of the shoe may be worn when the inspection is performed multiple times. For example, the tip surface of the shoe may be subjected to minute unevenness (so-called roughness) or uneven wear. In a case where the above-described wear arises, no fine contact state can be obtained between the tip surface of the shoe and the surface of the spot welding portion and inspection accuracy may be negatively affected. In a case where the probe and the shoe are inclined with respect to the surface of the spot welding portion, for example, the directions of the probe and the shoe are changed by the floating mechanism. In this case, however, the uneven wear may result from partial contact between a part of the tip surface of the shoe and the surface of the spot welding portion. Accordingly, when it comes to the welding portion inspection device according to the related art, the shoe can hardly be used over a long period of time and the shoe needs to be replaced often.

The present disclosure provides a welding portion inspection device that is capable of suppressing wear of a tip surface of a sound propagation medium (a shoe).

An aspect of the present disclosure relates to a welding portion inspection device including a device body, a probe configured to oscillate an ultrasonic wave and detect a reflected wave of the ultrasonic wave, a sound propagation medium attached to a tip of the probe, an elastic support mechanism configured to allow the probe and the sound propagation medium to be elastically supported to the device body, and a guide member formed of a material higher in hardness than a metal plate. The guide member is disposed such that a first part is positioned on a side of the sound propagation medium and second parts protrude beyond a tip surface of the sound propagation medium. The probe is configured to oscillate the ultrasonic wave such that the ultrasonic wave is emitted to a welding portion of the metal plate through the sound propagation medium and perform inspection of the welding portion based on the detected reflected wave of the ultrasonic wave in a state where the tip surface of the sound propagation medium faces the welding portion.

According to the aspect of the present disclosure, the second parts (parts protruding beyond the tip surface of the sound propagation medium, hereinafter, referred to as protruding parts in some cases) of the guide member abut against a surface of the welding portion during the inspection of the welding portion performed in a state where the tip surface of the sound propagation medium faces the welding portion. Accordingly, the tip surface of the sound propagation medium does not directly abut against the surface of the welding portion. Therefore, even when the above-described inspection is performed multiple times, wear of the tip surface of the sound propagation medium can be avoided, roughness or uneven wear of the tip surface of the sound propagation medium can be suppressed, and a very high level of inspection accuracy can be maintained. As a result, the sound propagation medium can be used over a long period of time, and the frequency of replacement of the sound propagation medium can be significantly reduced or the necessity of replacement of the sound propagation medium can be eliminated.

In the welding portion inspection device according to the aspect of the present disclosure, the second parts of the guide member may be disposed in a plurality of places in an outer edge portion of the guide member.

According to the aspect of the present disclosure, each of the protruding parts disposed in the places in the guide member (the second parts of the guide member protruding beyond the tip surface of the sound propagation medium) abuts against the surface of the welding portion in a case where the guide member abuts against the surface of the welding portion. The protruding parts are disposed in the outer edge portion of the guide member, and thus have a certain distance with respect to the center of the sound propagation medium. Accordingly, in a case where the sound propagation medium and the probe are inclined with respect to the surface of the welding portion, the reaction force that is received from the surface of the welding portion at a time when the protruding parts abut against the surface of the welding portion can be obtained to a significant extent and the directions of the sound propagation medium and the probe can be changed with ease by the elastic support mechanism. In other words, the sound propagation medium and the probe can be given a posture orthogonal to the surface of the welding portion. Therefore, the protruding parts can be provided with a function to protect the sound propagation medium (a function to prevent the sound propagation medium from wearing by preventing the tip surface of the sound propagation medium from abutting against the surface of the welding portion) and a function (an alignment function) to give the sound propagation medium and the probe the posture orthogonal to the surface of the welding portion.

In the welding portion inspection device according to the aspect of the present disclosure, the tip surface of the sound propagation medium may have a rectangular shape and the second parts of the guide member may be disposed at outer side positions respectively adjacent to four corner portions of tip surface of the sound propagation medium.

According to the aspect of the present disclosure, an uneven part arising during welding may be present in the surface of the welding portion. For example, a dent attributable to pinching by an electrode of a welding machine is present as the uneven part after spot welding is performed. In a situation in which one of the protruding parts of the guide member (the second parts of the guide member protruding beyond the tip surface of the sound propagation medium) abuts against the uneven part (a projecting part, in particular), the sound propagation medium and the probe are unlikely to have the posture orthogonal to the surface of the welding portion. Accordingly, although it is preferable that the number of the protruding parts is small in order to avoid the abutting against the uneven part present in the surface of the welding portion, it is also preferable that the number of the protruding parts is large in order to sufficiently demonstrate the alignment function. In the present solving means, the protruding parts are disposed at the outer side positions respectively adjacent to the four corner portions of the tip surface of the rectangular sound propagation medium in view of these points so that the protruding parts are unlikely to abut against the uneven part present in the surface of the welding portion by the number of the protruding parts being minimized within a range in which the alignment function can be sufficiently obtained. As a result, the alignment function can be sufficiently obtained and the sound propagation medium and the probe can be given the posture orthogonal to the surface of the welding portion.

The welding portion inspection device according to the aspect of the present disclosure may further include an arm of an articulated robot. The probe and the sound propagation medium may be attached to a tip portion of the arm and the arm may be configured to be operated such that the tip surface of the sound propagation medium faces the welding portion during the inspection of the welding portion.

According to the aspect of the present disclosure, the sound propagation medium may abut against the surface of the welding portion at a relatively high speed in the welding portion inspection device according to the related art that is not provided with the guide member in a case where the inspection of the welding portion is performed by the welding portion inspection device being attached to the arm tip portion of the articulated robot as described above. This occurs in a case where, for example, teaching of the articulated robot is not properly performed. In this case, a situation arises in which concerns rise over damage to the sound propagation medium. In the aspect of the present disclosure, in contrast, the sound propagation medium does not directly abut against the surface of the welding portion by the guide member being provided, and thus damage to the sound propagation medium can be suppressed even in a case where the teaching of the articulated robot is not properly performed. In other words, the practicality of the automation of the welding portion inspection using the articulated robot can be enhanced by the guide member being provided.

The welding portion inspection device according to the aspect of the present disclosure may further include a gel application device configured to apply gel to a surface of the welding portion by an amount larger than a capacity of a space formed between the tip surface of the sound propagation medium and the surface of the welding portion when the guide member is allowed to abut against the surface of the welding portion.

According to the aspect of the present disclosure, the second parts of the guide member protrude beyond the tip surface of the sound propagation medium, and thus the space is formed between the tip surface of the sound propagation medium and the surface of the welding portion during the inspection of the welding portion. When air is present between the tip surface of the sound propagation medium and the surface of the welding portion, the emission of the ultrasonic wave to the welding portion may not be properly performed. Accordingly, gel needs to be interposed between the tip surface of the sound propagation medium and the surface of the welding portion. In the present solving means, the gel application device is provided for the space to be filled with gel and the amount of the gel applied by the gel application device is set to an amount larger than the capacity of the space. As a result, the presence of air between the tip surface of the sound propagation medium and the surface of the welding portion can be suppressed, the emission of the ultrasonic wave to the welding portion can be properly performed, and a high level of inspection accuracy can be obtained.

According to the aspect of the present disclosure, the guide member positioned on the side of the sound propagation medium of the welding portion inspection device is provided and the second parts of the guide member protrude beyond the tip surface of the sound propagation medium. Accordingly, the sound propagation medium does not directly abut against the surface of the welding portion and wear of the tip surface of the sound propagation medium can be avoided. As a result, the sound propagation medium can be used over a long period of time, and the frequency of replacement of the sound propagation medium can be significantly reduced or the necessity of replacement of the sound propagation medium can be eliminated.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, an embodiment of the present disclosure will be described with reference to accompanying drawings. In the present embodiment, a case will be described where the present disclosure is applied as a welding portion inspection device for inspecting the welding quality of a spot welding portion in an inspection process on a vehicle body production line for a vehicle.

Description of Overall Configuration of Welding Portion Inspection Device

Figure 1:
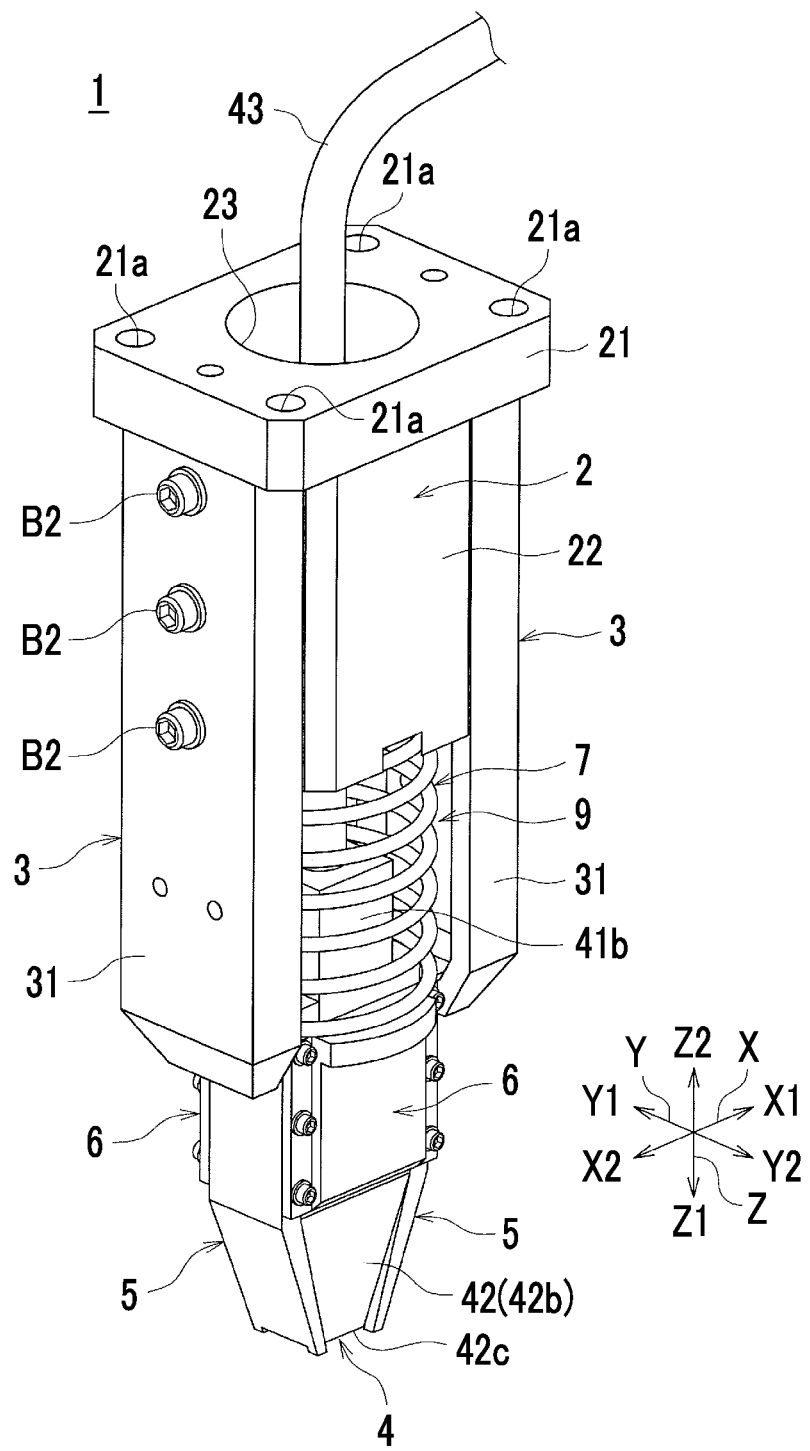
FIG. 1 is a perspective view of a welding portion inspection device according to an embodiment.
Figure 2:
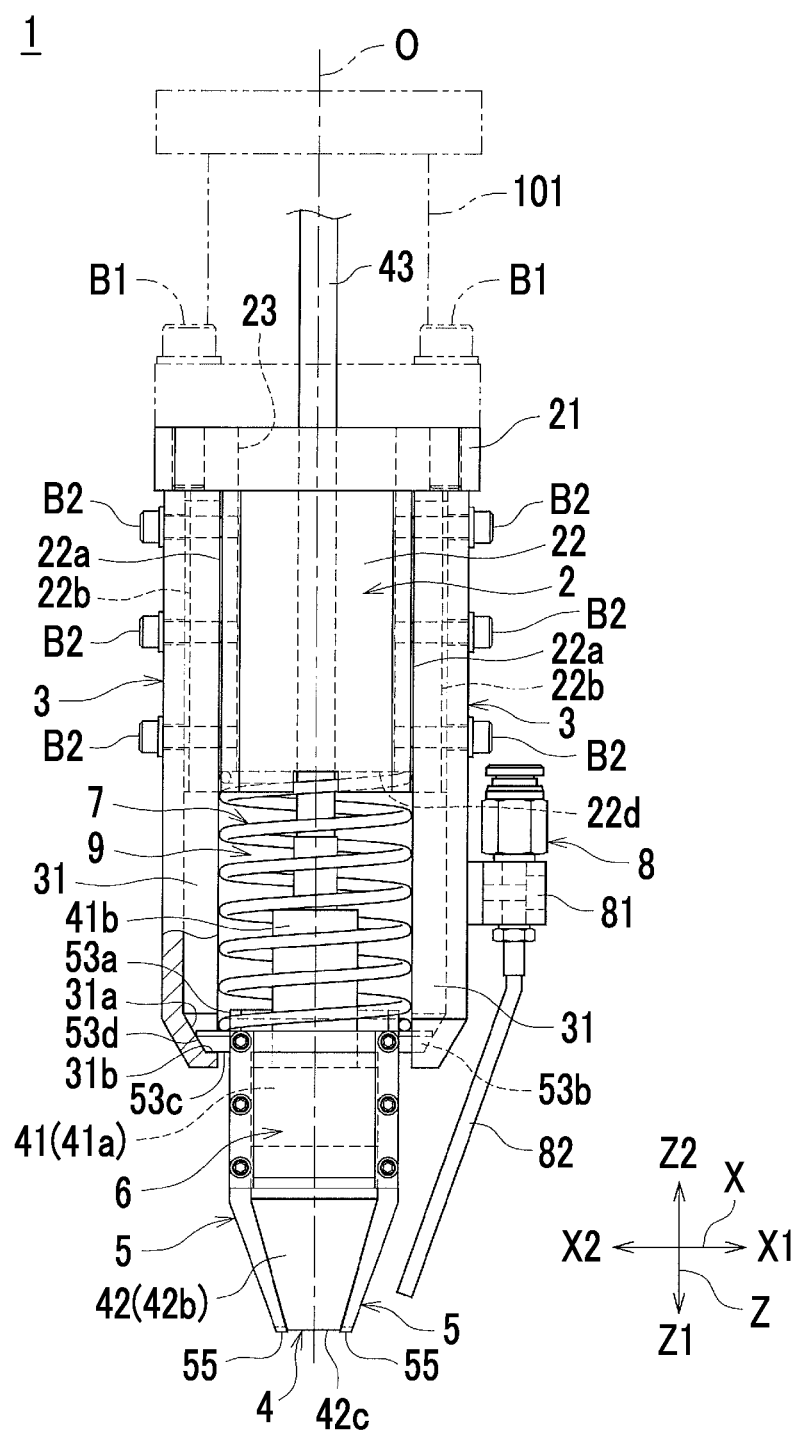
FIG. 2 is a cutaway front view of a part of the welding portion inspection device according to the embodiment.
Figure 3:
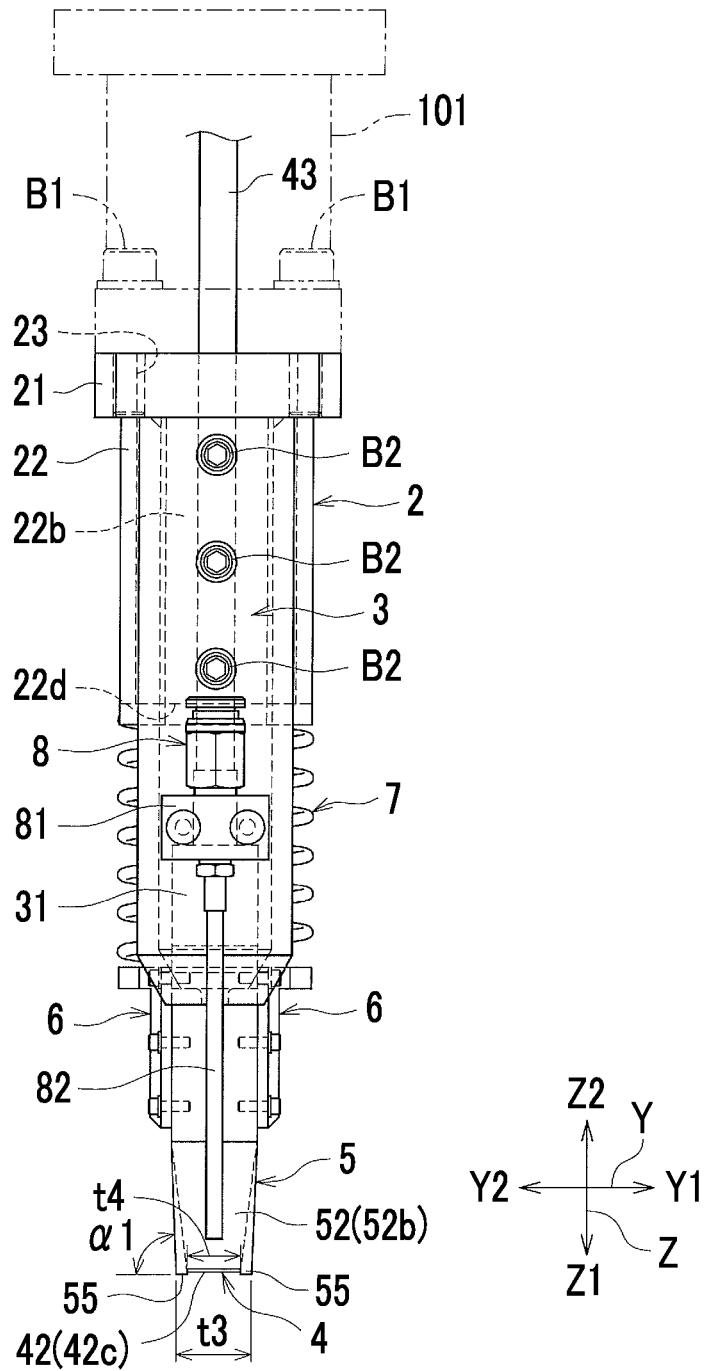
FIG. 3 is a side view of the welding portion inspection device according to the embodiment.
Figure 4:
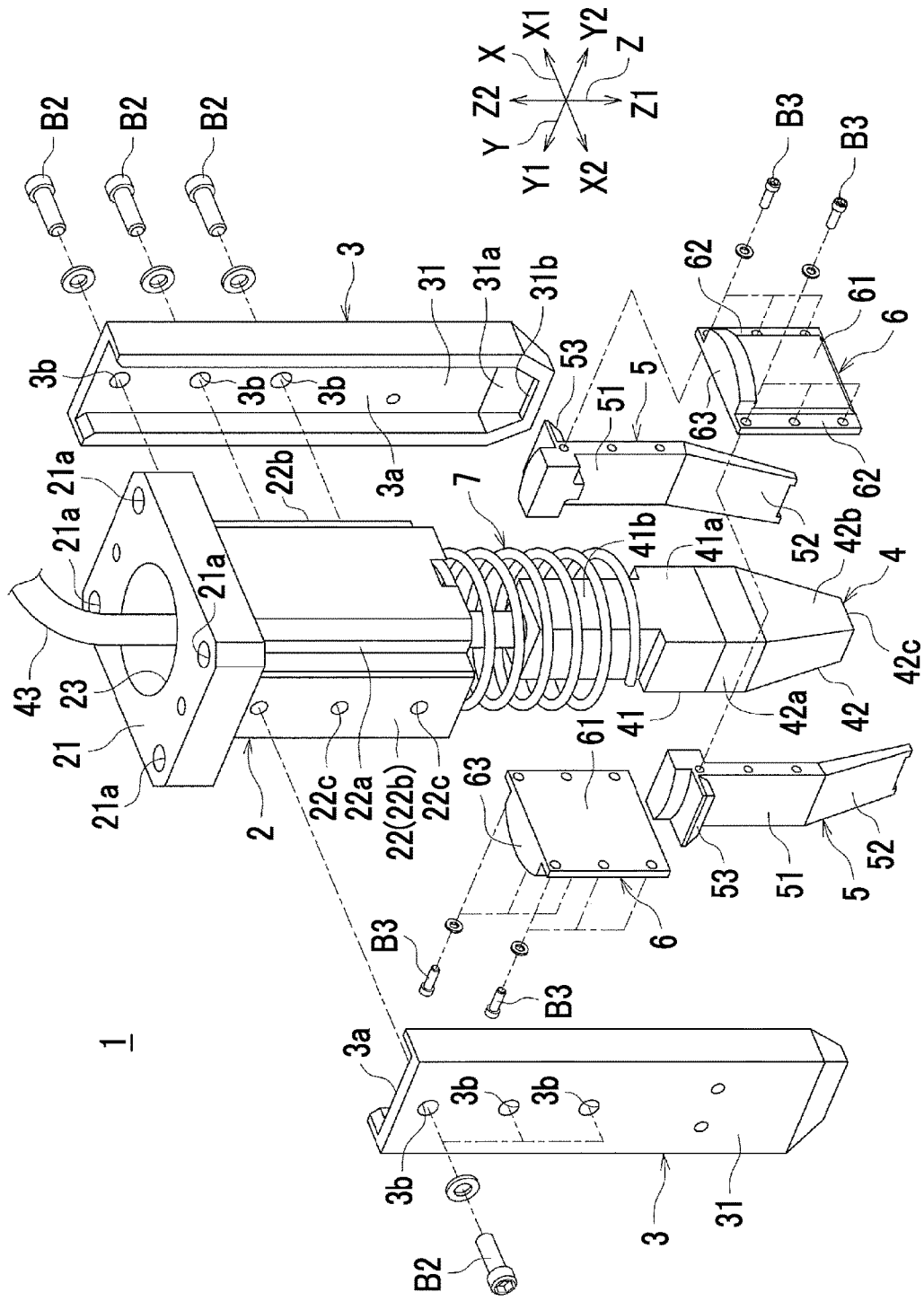
FIG. 4 is a diagram for showing assembly work for the welding portion inspection device according to the embodiment.

An overall configuration of the welding portion inspection device according to the present embodiment will be described first. FIG. 1 is a perspective view of a welding portion inspection device 1. FIG. 2 is a cutaway front view of a part of the welding portion inspection device 1. FIG. 3 is a side view of the welding portion inspection device 1. FIG. 4 is a diagram for showing assembly work for the welding portion inspection device 1.

In the following description, the direction (the up-down direction in FIG. 2) along a center line O (refer to the one-dot chain line in FIG. 2) of the welding portion inspection device 1 will be referred to as a Z direction. The width direction of the welding portion inspection device 1 (the right-left direction in FIG. 2), which is the direction orthogonal to the Z direction, will be referred to as an X direction. The thickness direction of the welding portion inspection device 1 (the right-left direction in FIG. 3), which is the direction orthogonal to the Z direction, will be referred to as a Y direction. The lower side in FIG. 2 in the Z direction will be referred to as a Z1 direction, and the upper side in FIG. 2 in the Z direction will be referred to as a Z2 direction. The right side in FIG. 2 in the X direction will be referred to as an X1 direction, and the left side in FIG. 2 in the X direction will be referred to as an X2 direction. The right side in FIG. 3 in the Y direction will be referred to as a Y1 direction, and the left side in FIG. 3 in the Y direction will be referred to as a Y2 direction. In the following description, the lower side surface of the welding portion inspection device 1 at a time when the welding portion inspection device 1 has the posture that is illustrated in FIGS. 1 to 4 will be referred to as the lower surface of the welding portion inspection device 1 and its lower side at a time when the welding portion inspection device 1 has the posture that is illustrated in FIGS. 1 to 4 will be referred to as its lower side.

As illustrated in FIGS. 1 to 4, one base bracket (one device body) 2, two guide brackets 3, one ultrasonic inspection unit 4, two probe guides 5, two probe clamps 6, one coil spring 7, and one gel application device 8 are integrally assembled to constitute the welding portion inspection device 1. The welding portion inspection device 1 emits an ultrasonic wave from the ultrasonic inspection unit 4 to the spot welding portion (a welding portion of a metal plate (a steel plate)) and outputs information relating to the welding quality of the spot welding portion based on a reflected wave (a reflection echo) of the ultrasonic wave. Hereinafter, each member constituting the welding portion inspection device 1 will be described.

Base Bracket

The base bracket 2 is provided with a base plate 21 and a base bracket body 22.

The base plate 21 is a part attached to an arm tip portion 101 of an articulated robot 100 (refer to FIG. 8, described later) and has a substantially rectangular parallelepiped shape. Bolt holes 21a are formed through the base plate 21 along its plate thickness direction (the Z direction). Bolts B1 for bolting to the arm tip portion 101 of the articulated robot 100 are screwed into the bolt holes 21a. In FIGS. 2 and 3, each of the arm tip portion 101 of the articulated robot 100 to which the base plate 21 is attached and each of the bolts B1 is indicated by an imaginary line.

The base bracket body 22 is a part continuous to the lower side (the Z1 direction side) of the base plate 21. Projecting portions 22b extending along the up-down direction (the Z direction) are disposed at middle parts in the Y direction, of side surfaces (side surfaces respectively positioned on the X1 direction side and the X2 direction side) 22a of the base bracket body 22, respectively. Bolt holes 22c (refer to FIG. 4) are formed along the X direction through the middle parts of the projecting portions 22b (middle parts in the Y direction). The bolt holes 22c are formed in three places in the up-down direction. A groove 22d (refer to FIGS. 2 and 3) is formed in the lower surface of the base bracket body 22 (a surface positioned on the Z1 direction side). The upper end portion of the coil spring 7 (an upper end portion that is ground and has a closed end shape, described later) is fitted into the groove 22d.

A unit insertion hole 23 is formed in the base plate 21 and the base bracket body 22. The unit insertion hole 23 spans both the base plate 21 and the base bracket body 22, is formed through the base plate 21 and the base bracket body 22 in the direction along the center line O (in the Z direction), and is formed for inserting the ultrasonic inspection unit 4.

Guide Bracket

The guide bracket 3 is a member assembled to the side surface 22a of the base bracket body 22. A recessed portion 3a (refer to FIG. 4) is formed in the inner side surface of the guide bracket 3 that faces the base bracket body 22. The projecting portion 22b disposed on the side surface 22a of the base bracket body 22 is fitted into the recessed portion 3a. Bolt insertion holes 3b corresponding to the bolt holes 22c formed in the base bracket body 22 are formed in the guide bracket 3. The guide brackets 3 are respectively assembled to the side surfaces 22a of the base bracket 2 by the bolt insertion holes 3b being aligned with the bolt holes 22c in the base bracket body 22, bolts B2 being inserted into the bolt insertion holes 3b, and the bolts B2 being screwed into the bolt holes 22c.

The dimension of the guide bracket 3 in the longitudinal direction (the Z direction) is set to be longer than the dimension of the base bracket body 22 in the longitudinal direction. In a state where each of the guide brackets 3 is assembled to the base bracket body 22, the upper surface position of each of the guide brackets 3 corresponds to the upper end position of the base bracket body 22. Accordingly, the lower side part of each of the guide brackets 3 extends to the lower side (the Z1 side) beyond the lower end of the base bracket 2. Hereinafter, the part that extends to the lower side as described above will be referred to as an extending portion 31 of the guide bracket 3.

As illustrated in the partial cutaway view of FIG. 2, an inclined surface 31a and a stopper surface 31b are formed on the inner side surface of the lower portion of the extending portion 31 of the guide bracket 3 (an inner side surface facing the center line O side). The inclined surface 31a is inclined inward toward the lower side (the Z1 side). The stopper surface 31b extends horizontally inward from the lower end of the inclined surface 31a. The inclined surface 31a and the stopper surface 31b are parts demonstrating the retaining function and the positioning function of the ultrasonic inspection unit 4 (the functions will be described later).

Ultrasonic Inspection Unit

The ultrasonic inspection unit 4 is provided with a probe (an ultrasonic transducer) 41, a shoe 42, and a signal cable 43.

The probe 41 is provided with a probe body 41a that has a rectangular parallelepiped shape and a connector portion 41b that is integrally formed on the upper side of the probe body 41a. The signal cable 43 is connected to the connector portion 41b. A substrate is accommodated in the probe body 41a, and the substrate has multiple piezoelectric vibrating elements aligned in a matrix shape. An operation signal generated by a controller (not illustrated) is transmitted to each of the piezoelectric vibrating elements through the signal cable 43. The ultrasonic wave is oscillated by each of the piezoelectric vibrating elements being operated in accordance with the operation signal.

The probe 41 has a lower surface (a surface positioned on the Z1 direction side) that has a rectangular shape. The lower surface of the probe 41 may have a square shape or a circular shape as well.

The shoe 42 is the sound propagation medium of the present disclosure. The shoe 42 is attached to the tip of the probe 41 by screwing or the like. A material that has excellent ultrasonic transmission properties forms the shoe 42. For example, the shoe 42 is formed of an acrylic resin. The shoe 42 has a base portion 42a that has a rectangular parallelepiped shape and is attached to the tip of the probe 41 and a tip portion 42b that has a square truncated pyramid shape and is continuous to the lower side (the Z1 side) of the base portion 42a. The shape of the upper surface of the shoe 42 (the upper surface of the base portion 42a) corresponds to the shape of the lower surface of the probe 41. In other words, the upper surface of the shoe 42 (the upper surface of the base portion 42a) has a rectangular shape. The upper surface of the shoe 42 may have a square shape or a circular shape as well. The tip portion 42b has a shape tapered toward the tip side (the square truncated pyramid shape). A tip surface 42c of the tip portion 42b (the lower surface of the shoe 42) has a square shape. One side of the tip surface 42c of the tip portion 42b (the lower surface of the shoe 42) is, for example, 10 mm. The dimension of the above-described side is not limited thereto. The tip surface 42c of the shoe 42 may have a rectangular shape or a circular shape as well.

The signal cable 43 connects the controller and the probe 41 to each other and performs signal transmission and reception between the controller and the probe 41. In other words, the signal cable 43 transmits the operation signal to each of the piezoelectric vibrating elements of the probe 41 and transmits to the controller an electric signal based on the reflection echo received by each of the piezoelectric vibrating elements.

The controller sends the electric signal of the reflection echo to a signal processing unit through a signal detection circuit, performs parallel operation processing with the signal processing unit, determines whether the welding quality of the spot welding portion as an inspection object is high or low, and outputs the result of the determination.

Probe Guide

Figure 5:
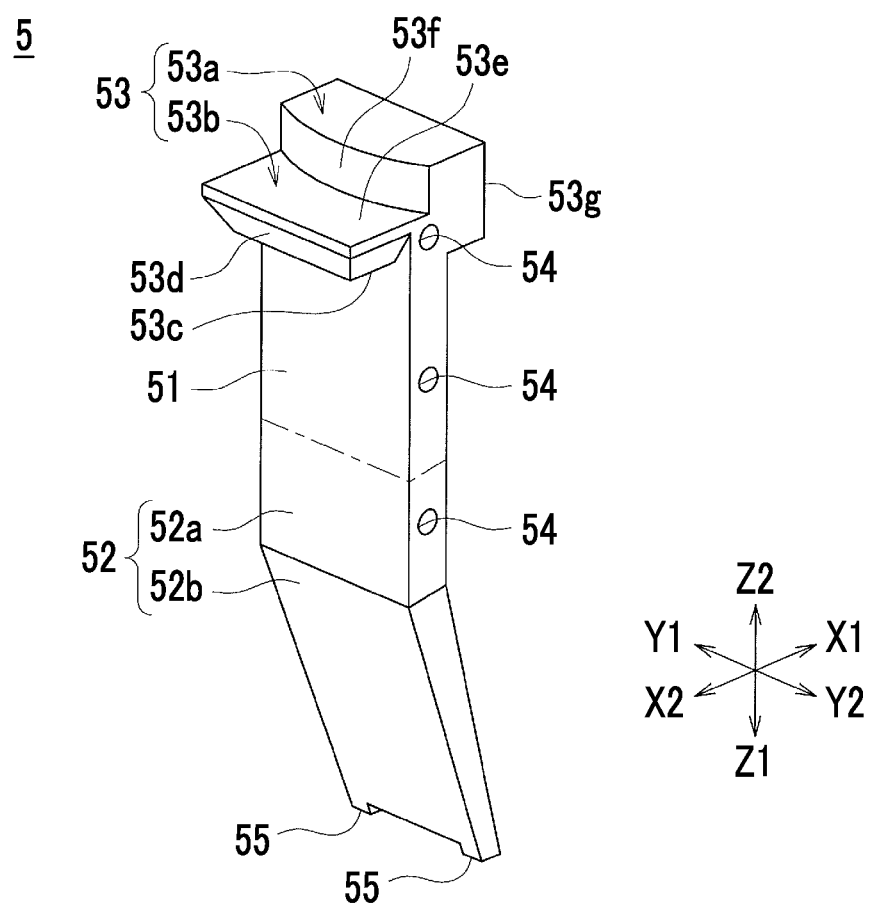
FIG. 5 is a perspective view of a probe guide.

The probe guide 5 is a characteristic member of the present embodiment. The probe guide 5 is a member covering the side surfaces of the probe 41 and the shoe 42 (side surfaces respectively positioned on the X1 direction side and the X2 direction side). FIG. 5 is a perspective view of one of the probe guides 5. The right and left probe guides 5 make a pair. Both right and left side surfaces of the probe 41 and the shoe 42 are covered by the right and left probe guides 5, respectively.

As illustrated in FIG. 5, the probe guide 5 is provided with a probe guide portion 51 (the part above the one-dot chain line illustrated in FIG. 5), a shoe guide portion 52 (the part below the one-dot chain line illustrated in FIG. 5), and a locking portion 53. The probe guide portion 51 covers the side surface of the probe 41. The shoe guide portion 52 is continuous to the lower side of the probe guide portion 51 and covers the side surface of the shoe 42. The locking portion 53 is continuous to the upper side of the probe guide portion 51 and is locked to the guide bracket 3.

The probe guide portion 51 has a flat plate shape. The shape of the side surface of the probe guide portion 51 (that is seen from the X direction) substantially corresponds to the shape of the side surface of the probe body 41a of the probe 41. The entire side surface of the probe body 41a is covered by the probe guide portion 51 by the probe guide portion 51 overlapping the side surface of the probe body 41a of the probe 41.

The shoe guide portion 52 covers the entire side surface of the shoe 42 by overlapping each of the side surfaces of the base portion 42a and the tip portion 42b of the shoe 42. In other words, the shoe guide portion 52 has a flat plate-shaped flat plate portion 52a along the side surface of the base portion 42a of the shoe 42 and an inclined plate portion 52b inclined from the lower end of the flat plate portion 52a toward the center line O side to be along the side surface of the tip portion 42b of the shoe 42.

The locking portion 53 is provided with a hold portion 53a grasping the connector portion 41b of the probe 41 and a positioning unit 53b performing retaining and positioning on the ultrasonic inspection unit 4 by abutting against the inclined surface 31a and the stopper surface 31b formed in the guide bracket 3.

An inner surface 53g of the hold portion 53a (a surface positioned on the X1 direction side in FIG. 5) protrudes to be positioned closer to the connector portion 41b side (the X1 direction side) than the inner surface of the probe guide portion 51. The protruding dimension of the hold portion 53a substantially corresponds to the protruding dimension of the side surface of the probe body 41a with respect to the side surface of the connector portion 41b. Accordingly, the inner surface 53g of the hold portion 53a abuts against the side surface of the connector portion 41b in a state where the probe guide portion 51 overlaps the side surface of the probe body 41a. The right and left probe guides 5 make a pair. Accordingly, in a state where the probe guides 5 abut against the respective side surfaces of the probe 41 and the shoe 42, the connector portion 41b is pinched (refer to FIG. 2) from both right and left sides (both sides in the X direction) by the respective hold portions 53a of the probe guides 5 by the inner surfaces 53g of the hold portions 53a of the probe guides 5 abutting against the side surfaces of the connector portion 41b, respectively. An outer surface 53f of the hold portion 53a (a surface positioned on the X2 direction side in FIG. 5) has an arc shape in plan view (when seen from the Z direction). The radius of the arc of the outer surface 53f substantially corresponds to the radius of the inner peripheral portion of the coil spring 7 (described later). The coil spring 7 is positioned by the inner peripheral portion of the coil spring 7 abutting against the outer surface 53f in a state where the lower end portion of the coil spring 7 is fitted into the hold portion 53a.

The positioning unit 53b protrudes toward the outside (the guide bracket 3 side) beyond the outer surface of the probe guide portion 51. The positioning unit 53b has a horizontally extending lower surface 53c and an inclined surface 53d inclined upward toward the outside from the outer side end of the lower surface 53c. The inclination angle of the inclined surface 53d (an inclination angle with respect to the lower surface 53c) substantially corresponds to the inclination angle of the inclined surface 31a (an inclination angle with respect to the stopper surface 31b) formed on the inner side surface of the extending portion 31 of the guide bracket 3. Accordingly, in a state where the lower surface 53c of the positioning unit 53b abuts against the stopper surface 31b of the guide bracket 3 as illustrated in FIG. 2, the inclined surface 53d of the positioning unit 53b is along the inclined surface 31a of the guide bracket 3. In other words, the retaining function of the ultrasonic inspection unit 4 (a function to prevent falling of the probe 41 from the guide brackets 3) is demonstrated by the lower surface 53c and the stopper surface 31b abutting against each other and the positioning function to allow the center lines of the probe 41 and the shoe 42 of the ultrasonic inspection unit 4 to correspond to the center line O of the welding portion inspection device 1 is demonstrated by the inclined surface 53d and the inclined surface 31a abutting against each other. An upper surface 53e of the positioning unit 53b is configured as a spring bearing seat against which the lower end portion of the coil spring 7 (a lower end portion that is ground and has a closed end shape) abuts.

Bolt holes 54 are formed through the probe guide 5 along the Y direction. The bolt holes 54 are formed in three places in the up-down direction (the Z direction) spanning the probe guide portion 51 and the shoe guide portion 52.

A material higher in hardness than the metal plate (the steel plate) constituting the vehicle body of the vehicle forms the probe guide 5. For example, the probe guide 5 is formed of stainless steel. The material of the probe guide 5 is not limited thereto. The material of the probe guide 5 is appropriately set.

As described above, the probe guide 5 covers the side surfaces of the probe 41 and the shoe 42. The probe guide 5 corresponds to the guide member of the present disclosure (a guide member formed of a material higher in hardness than the metal plate that constitutes the welding portion and positioned on the side of at least the sound propagation medium).

Probe Clamp

Figure 6:
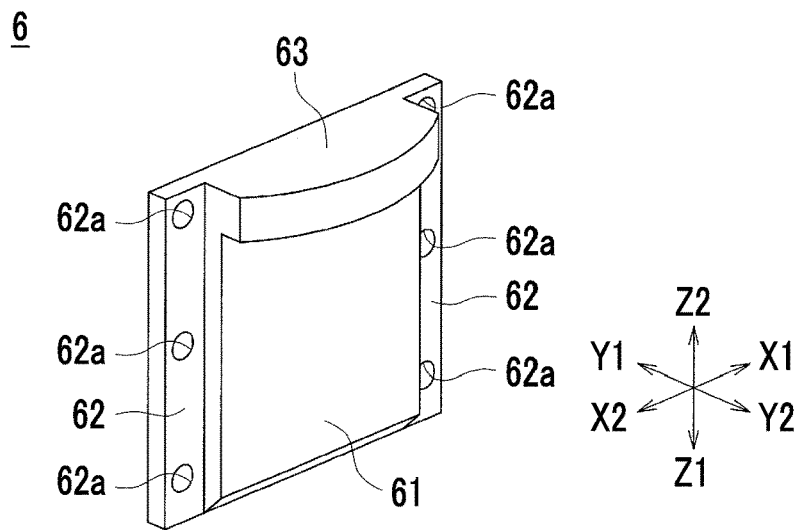
FIG. 6 is a perspective view of a probe clamp.

The probe clamp 6 is a member covering the front surface of the probe 41 (a surface positioned on the Y2 direction side) and the back surface of the probe 41 (a surface positioned on the Y1 direction side). FIG. 6 is a perspective view of one of the probe clamps 6. The probe clamp 6 is to assemble each of the probe guides 5 to the probe 41 in a non-detachable manner by connecting the probe guides 5 to each other.

Specifically, the probe clamp 6 is provided with a flat plate portion 61 and fastening portions 62. The flat plate portion 61 substantially corresponds to the shapes of the front surface and the back surface of the probe body 41a, and the fastening portions 62 are integrally formed on the X-direction outer sides of the flat plate portion 61. Bolt insertion holes 62a corresponding to the bolt holes 54 formed in the probe guides 5 are formed in the fastening portions 62. Each of the probe clamps 6 is assembled across the space between the probe guides 5 by the bolt insertion holes 62a being aligned with the bolt holes 54 in the probe guide 5, bolts B3 (refer to FIG. 4) being inserted into the bolt insertion holes 62a, and the bolts B3 being screwed into the bolt holes 54. In this state, each of the probe guides 5 and each of the probe clamps 6 are connected to each other, and thus each of the probe guides 5 and each of the probe clamps 6 are integrally assembled in a state where each of the probe guides 5 and each of the probe clamps 6 cover the outer circumferences of the probe 41 and the shoe 42.

A spring bearing seat 63 is formed on the flat plate portion 61 of the probe clamp 6. The spring bearing seat 63 protrudes in the direction that is orthogonal to the flat plate portion 61 (to the outside in the Y direction). The outer edge of the spring bearing seat 63 has an arc shape along the shape of the outer edge of the coil spring 7.

Projection of Probe Guide

The present embodiment is characterized in that projections 55 are disposed on the tip portion of the probe guide 5, which will be described in detail below.

Figure 7:
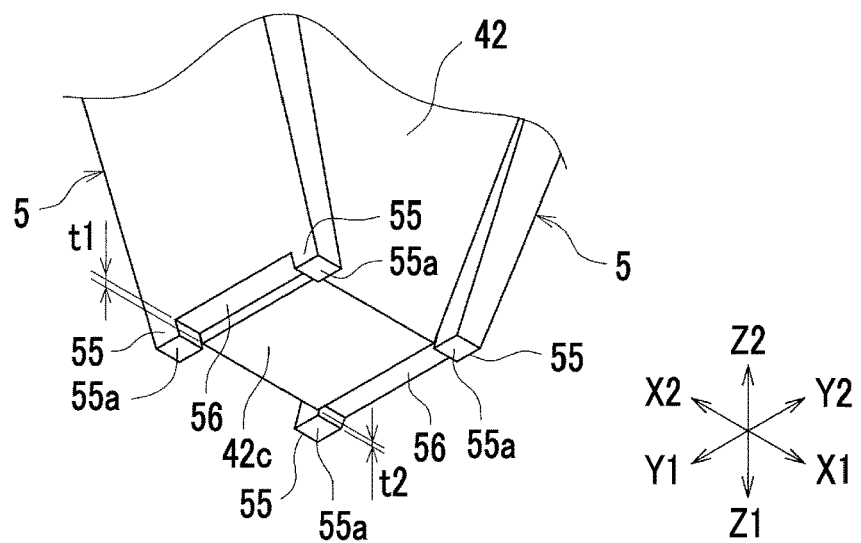
FIG. 7 is a perspective view of tip parts of a shoe and the probe guide.

FIG. 7 is a perspective view of the tip parts of the shoe 42 and the probe guide 5. As illustrated in FIG. 7, the rectangular parallelepiped-shaped projections 55 are integrally disposed on both longitudinal-direction (Y-direction) end portions of a tip portion 56 of the probe guide 5 (on an end portion on the Y1 direction side and an end portion on the Y2 direction side), respectively. The projection 55 has a square tip surface 55a that has one side which has a dimension corresponding to the dimension of the tip portion 56 of the probe guide 5 in the width direction (the X direction).

In a state where the probe guide 5 is assembled to the probe clamp 6 and covers the side surface of the shoe 42, the position of the tip portion 56 of the probe guide 5 (the Z-direction position of the tip portion 56 where the projection 55 is not disposed) is a position above the tip surface 42c of the shoe 42 (closer to the Z2 direction side). In other words, the tip surface 42c of the shoe 42 is positioned closer to the lower side (the Z1 side) than the tip portion 56 of the probe guide 5 by a dimension t1 illustrated in FIG. 7. The height dimensions of the projections 55 (dimensions in the Z direction) are set to be longer than the dimension t1. As a result, the tip surfaces 55a of the projections 55 are positioned closer to the lower side (the Z1 side) than the tip surface 42c of the shoe 42. In other words, the tip parts of the projections 55 protrude beyond the tip surface 42c of the shoe 42. The protruding dimension of the projection 55 (a protruding dimension t2 in FIG. 7) is set larger than the height dimension (the height dimension of a projecting portion, in particular) of a minute uneven part (an uneven part resulting from a dent attributable to pinching by an electrode of a welding machine) present in the surface of the spot welding portion. Specifically, the height dimensions of the projections 55 are set such that the protruding dimension from the tip surface 42c of the shoe 42 is 0.4 mm. The height dimensions of the projections 55 correspond to each other. The height dimension is not limited to the above value and is appropriately set. The configuration of the present disclosure in which "the second part of the guide member protrudes beyond the tip surface of the sound propagation medium" is realized by the configuration described above. In other words, the parts of the projections 55 that protrude beyond the tip surface 42c of the shoe 42 (the protruding dimension t2 parts) are the "second parts (protruding parts) of the guide member protruding beyond the tip surface of the sound propagation medium" of the present disclosure.

The inclined plate portion 52b (refer to FIG. 5) of the shoe guide portion 52 of the probe guide 5 has a width-direction (Y-direction) dimension gradually decreasing toward the lower side (the Z1 side) and has a substantially trapezoidal shape when seen from the X direction (refer to FIG. 3). The inclination angle (an angle α1 in FIG. 3) of the side edge of the inclined plate portion 52b that corresponds to the above-described trapezoidal hypotenuse is smaller than the inclination angle of the hypotenuse of the side surface of the tip portion 42b (the side surface of the tip portion 42b that is indicated by the dashed line in FIG. 3) of the shoe 42 (is an angle closer to a vertical angle than the hypotenuse of the side surface of the tip portion 42b of the shoe 42). Accordingly, the width dimension of the lower end part of the shoe guide portion 52 (a width dimension in the Y direction, a dimension t3 in FIG. 3) is larger than the dimension of one side of the tip surface 42c of the shoe 42 (a width dimension t4 of the lower end of the tip portion 42b of the shoe 42 indicated by the dashed line in FIG. 3). The projections 55 are disposed on both longitudinal-direction (Y-direction) end portions of the tip portion 56 of the probe guide 5. Accordingly, the projections 55 are disposed at positions outside each of the sides of the tip surface 42c of the shoe 42. More specifically, each of the projections 55 is disposed such that the corner portions of the tip surface 42c of the shoe 42 and the corner portions of the projection 55 abut against each other (refer to FIG. 7). In this manner, the projections 55 are disposed at outer side positions respectively adjacent to the four corner portions of the tip surface 42c of the shoe 42.

The projections 55 are disposed at the outer side positions respectively adjacent to the four corner portions of the tip surface 42c of the shoe 42 as described above for the following reason. In other words, the uneven part arising during welding may be present in the surface of the spot welding portion as described above. For example, the dent attributable to the pinching by the electrode of the welding machine is present as the uneven part. In a situation in which one of the plurality of projections 55 disposed on the tip portions 56 of the probe guides 5 abuts against the uneven part (a projecting part, in particular), the shoe 42 and the probe 41 are unlikely to have a posture orthogonal to the surface of the spot welding portion. Accordingly, although it is preferable that the number of the projections 55 is small in order to avoid the abutting against the uneven part present in the surface of the spot welding portion, it is also preferable that the number of the projections 55 is large in order to sufficiently demonstrate the alignment function that is to be described later (a function to give the shoe 42 and the probe 41 the posture orthogonal to the surface of the spot welding portion by using a floating mechanism 9 based on the coil spring 7). In the present embodiment, the projections 55 are disposed at the outer side positions respectively adjacent to the four corner portions of the tip surface 42c of the shoe 42 in view of these points so that the projections 55 are unlikely to abut against the uneven part present in the surface of the spot welding portion by the number of the projections 55 being minimized within a range in which the alignment function can be sufficiently obtained. As a result, the alignment function can be sufficiently obtained and the shoe 42 and the probe 41 can be given the posture orthogonal to the surface of the spot welding portion.

Coil Spring-based Floating Mechanism

The floating mechanism (an elastic support mechanism) 9 will be described below. The floating mechanism 9 allows the probe 41 and the shoe 42 to be elastically supported to the base bracket (the device body) 2 by using the coil spring 7. As described above, the positioning units 53b of the probe guides 5 are locked to the lower end portions of the guide brackets 3. In other words, the probe guides 5 are not fixed to the guide brackets 3. The coil spring 7 is interposed in a compressed state between the base bracket body 22 of the base bracket 2, and the upper surface of the spring bearing seat 63 of the probe clamp 6 and the upper surface 53e of the positioning unit 53b (refer to FIGS. 1 to 3). Accordingly, the ultrasonic inspection unit 4 can be displaced against a downward biasing force from the coil spring 7 while receiving the biasing force. The floating mechanism 9 is configured in this manner.

In other words, in a case where no external force acts on the probe guide 5 and so on, the lower surface 53c of the positioning unit 53b of the probe guide 5 abuts (is pressed) against the stopper surface 31b of the guide bracket 3 and the inclined surface 53d of the positioning unit 53b abuts (is pressed) against the inclined surface 31a of the guide bracket 3 (refer to FIG. 2) due to the biasing force of the coil spring 7, and thus the ultrasonic inspection unit 4 is positioned in a state where the center lines of the probe 41 and the shoe 42 of the ultrasonic inspection unit 4 correspond to the center line O of the welding portion inspection device 1. In contrast, in a case where an external force acts on the probe guide 5 and so on (in a case where an external force acts by the probe guide 5 abutting against the surface of the spot welding portion), the postures of the probe 41 and the shoe 42 of the ultrasonic inspection unit 4 can be changed by the coil spring 7 being elastically deformed by the external force and the lower surface 53c of the positioning unit 53b of the probe guide 5 being separated from the stopper surface 31b of the guide bracket 3 or the inclined surface 53d of the positioning unit 53b being separated from the inclined surface 31a of the guide bracket 3. In other words, the center lines of the probe 41 and the shoe 42 can be inclined with respect to the center line O of the welding portion inspection device 1 (refer to FIG. 10).

Gel Application Device

When air is present between the tip surface 42c of the shoe 42 and the surface of the spot welding portion during the inspection of the welding quality of the spot welding portion, the emission of the ultrasonic wave to the spot welding portion may not be properly performed. Accordingly, gel needs to be interposed between the tip surface 42c of the shoe 42 and the surface of the spot welding portion. In this regard, the welding portion inspection device 1 according to the present embodiment is provided with the gel application device 8 applying the gel to the surface of the spot welding portion.

The gel application device 8 applies a predetermined amount of gel to the surface of the spot welding portion. The gel application device 8 has a configuration in which a gel nozzle 82 is supported to a support bracket 81 attached to the guide bracket 3 that is on one side (the X1 direction side). The gel nozzle 82 has a tip portion (a gel discharge port) positioned near the tip portion of the probe guide 5. A gel supply pipe (not illustrated) is connected to the gel nozzle 82. The gel pumped by a pump (not illustrated) is introduced into the gel nozzle 82 from the gel supply pipe in accordance with an opening and closing operation of an electromagnetic valve. Then, the gel is applied toward the surface of the spot welding portion by the predetermined amount.

The amount of the gel applied to the surface of the spot welding portion from the gel application device 8 is set to an amount larger by a predetermined amount than the capacity of the space that is formed between the tip surface 42c of the shoe 42 and the surface of the spot welding portion when the projections 55 of the probe guides 5 abut against the surface of the spot welding portion. This is to prevent air from being present in the space. In other words, in the present embodiment, the space (that is absent in the related art) is formed between the tip surface 42c of the shoe 42 and the surface of the spot welding portion since the projections 55 are disposed on the tip portion 56 of the probe guide 5. As described above, the emission of the ultrasonic wave to the spot welding portion may not be properly performed when air is present between the tip surface 42c of the shoe 42 and the surface of the spot welding portion, and thus gel needs to be interposed between the tip surface 42c of the shoe 42 and the surface of the spot welding portion. In the present embodiment, the amount by which the gel is applied is set to an amount larger than the capacity of the space for the space to be filled with the gel. As a result, the presence of air between the tip surface 42c of the shoe 42 and the surface of the spot welding portion can be suppressed, the emission of the ultrasonic wave to the spot welding portion can be properly performed, and a high level of inspection accuracy can be obtained. The opening and closing operation of the electromagnetic valve for adjusting the amount by which the gel is applied and a timing at which the gel is applied is performed based on a control signal from the controller.

Assembly Work for Welding Portion Inspection Device

Hereinafter, the assembly work for the welding portion inspection device 1 will be briefly described. During the assembly work, the probe 41 and the shoe 42 of the ultrasonic inspection unit 4 are inserted from above into the unit insertion hole 23 in the base bracket 2 as illustrated in FIG. 4. Then, the probe 41 and the shoe 42 are passed through the inside of the coil spring 7, and the upper end portion of the coil spring 7 is fitted into the groove 22d (refer to FIG. 2) formed in the lower surface of the base bracket body 22.

The probe guides 5 and the probe clamps 6 are integrally assembled with the bolts B3 after the probe guides 5 are allowed to abut against the respective side surfaces of the probe 41 and the shoe 42 and the probe clamps 6 are allowed to abut against the front surface and the back surface of the probe 41.

Then, the guide brackets 3 are assembled with the bolts B2 to the side surfaces 22a of the base bracket 2, respectively. At that time, the coil spring 7 is interposed in a compressed state between the base bracket body 22, and the probe guide 5 and the probe clamp 6 by the lower end portion of the coil spring 7 being fitted into the hold portion 53a and the lower end portion of the coil spring 7 being allowed to abut against the upper surface 53e of the positioning unit 53b and the spring bearing seat 63. The positioning units 53b of the probe guides 5 are locked to the guide brackets 3. In other words, the lower surface 53c of the positioning unit 53b is allowed to abut against the stopper surface 31b of the guide bracket 3 and the inclined surface 53d of the positioning unit 53b is allowed to abut against the inclined surface 31a of the guide bracket 3 (refer to FIG. 2). In a state where the guide brackets 3 are assembled to the respective side surfaces 22a of the base bracket 2 in this manner, the retaining function and the positioning function of the ultrasonic inspection unit 4 are demonstrated. The floating mechanism 9 is configured. Then, the gel nozzle 82 is attached to the guide bracket 3 via the support bracket 81.

Welding Portion Inspection Operation

A welding portion inspection operation will be described below.

Figure 8:
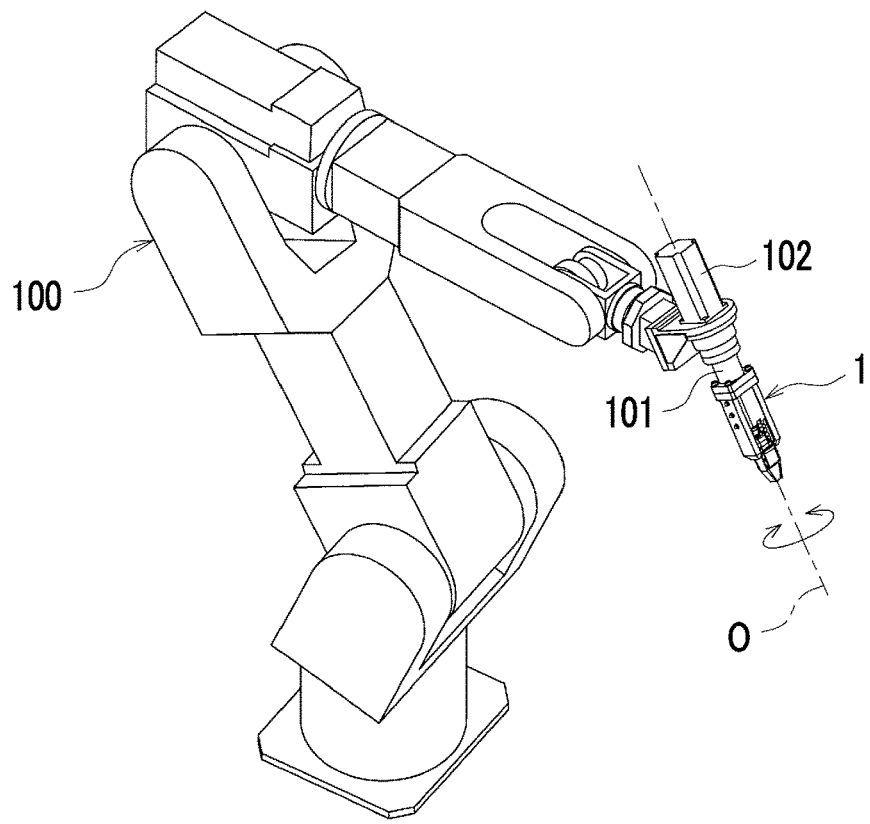
FIG. 8 is a perspective view illustrating a state where the welding portion inspection device is attached to an articulated robot.

Welding portion inspection is performed by the articulated robot 100 being operated after the welding portion inspection device 1 configured as described above is attached to the arm tip portion 101 of the articulated robot 100 (refer to FIG. 8).

The articulated robot 100 that is adopted in the present embodiment is provided with a plurality of rotary shafts. The arm tip portion 101 of the articulated robot 100 is rotatable about the center line O of the welding portion inspection device 1. In other words, the arm tip portion 101 is provided with an electric motor 102 that is capable of rotating coaxially with the center line O of the welding portion inspection device 1 and the welding portion inspection device 1 is configured to be rotatable about the center line O by the rotation of the arm tip portion 101 resulting from the operation of the electric motor 102 (refer to the arrow about the center line O that is illustrated in FIG. 8).

Although the vehicle body of the vehicle has multiple spot welding portions, the spot welding portion in a predetermined place set in advance among the multiple spot welding portions is inspected as an inspection object during the welding portion inspection. In other words, information (information such as the rotation angle amount of each joint) for moving the welding portion inspection device 1 toward the spot welding portion that is the inspection object is input in advance to the articulated robot 100 by offline teaching, and the welding portion inspection device 1 is sequentially moved toward the spot welding portion that is the inspection object by the articulated robot 100 being operated in accordance with the above information with respect to the vehicle body transported up to the inspection process on the vehicle body production line.

Once the inspection of the spot welding portion is initiated, the welding portion inspection device 1 is moved up to the position where the tip surface 42c of the shoe 42 faces the spot welding portion that is the inspection object by the articulated robot 100 being operated. At this point in time, the projections 55 of the probe guides 5 are yet to abut against the surface of the spot welding portion. A predetermined amount of gel is applied to the surface of the spot welding portion from the gel nozzle 82 of the gel application device 8 before the projections 55 of the probe guides 5 abut against the surface of the spot welding portion. Subsequently, the articulated robot 100 is operated such that the welding portion inspection device 1 approaches the spot welding portion, and the projections 55 of the probe guides 5 abut against the surface of the spot welding portion.

Figure 9A:
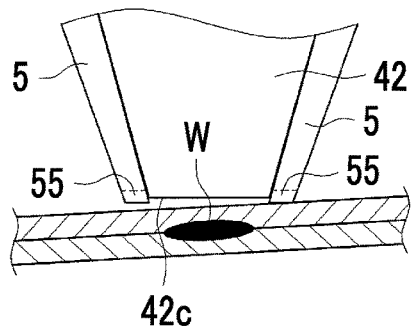
FIG. 9A is a front view of the tip parts of the shoe and the probe guide and is a diagram illustrating a state at a point in time when the tip of the probe guide abuts against the surface of a spot welding portion.
Figure 9B:
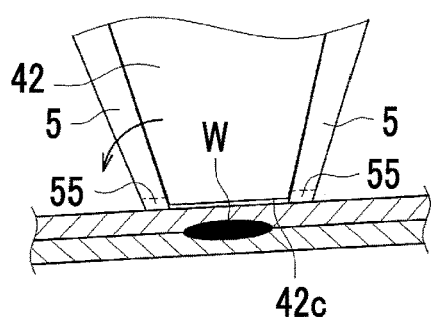
FIG. 9B is a front view of the tip parts of the shoe and the probe guide and is a diagram illustrating a state where automatic alignment by a floating mechanism is performed.
Figure 10:
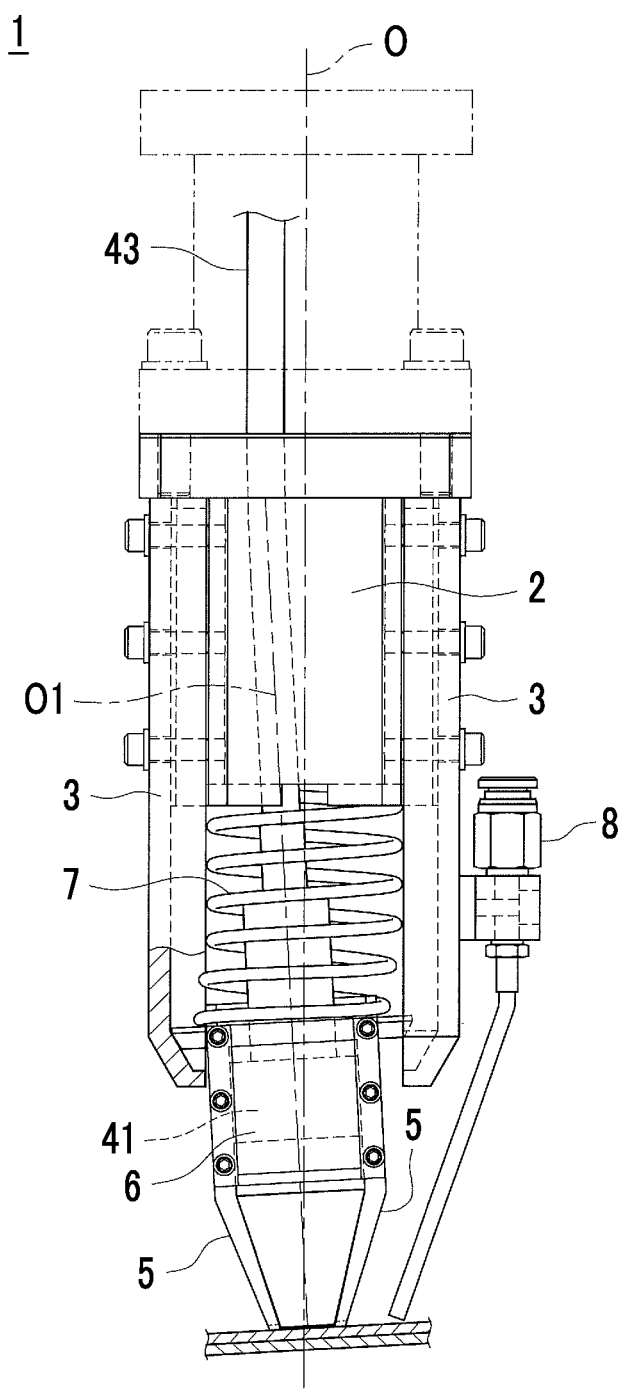
FIG. 10 is a diagram illustrating the state where the automatic alignment by the floating mechanism is performed, which corresponds to FIG. 2.
Figure 11:
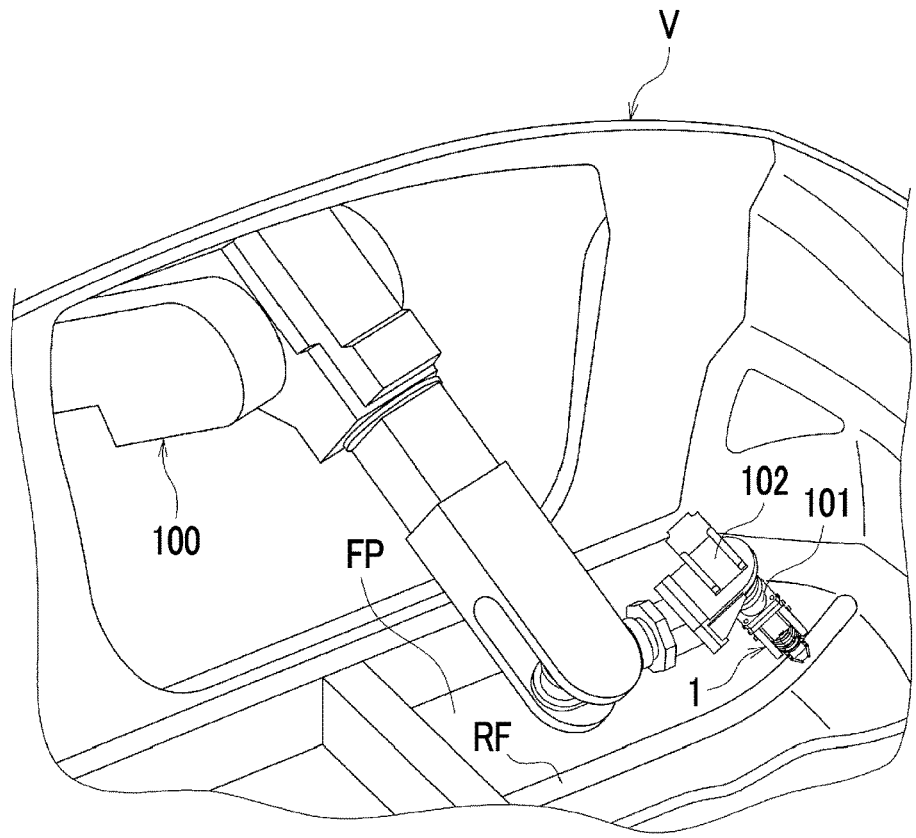
FIG. 11 is a perspective view illustrating a state where inspection of the spot welding portion of a vehicle body is performed.

At that time, the projection (the projection on one side) 55 abuts against the surface of a spot welding portion W and receives the reaction force from the surface at that time in a case where the probe 41 and the shoe 42 are inclined with respect to the surface of the spot welding portion W as illustrated in FIG. 9A. The coil spring 7 is elastically deformed by the reaction force, the directions of the probe 41 and the shoe 42 are changed as indicated by the arrow illustrated in FIG. 9B, and the probe 41 and the shoe 42 have a posture orthogonal to the surface of the spot welding portion W. At this point in time, all of the projections 55 abut against the surface of the spot welding portion. In the present embodiment, in particular, the projections 55 are disposed in the outer edge portions of the tip portions 56 of the probe guides 5, and thus have a certain distance with respect to the center of the tip surface 42c of the shoe 42. Accordingly, the reaction force can be obtained to a significant extent and the directions of the probe 41 and the shoe 42 can be changed with ease. FIG. 10 is a front view illustrating a state where the directions of the probe 41 and the shoe 42 are changed and the probe 41 and the shoe 42 have the posture orthogonal to the surface of the spot welding portion. As is apparent from FIG. 10, a center line O1 of the probe 41 and the shoe 42 is inclined with respect to the center line O of the welding portion inspection device 1 in a case where automatic alignment is performed by the alignment function of the floating mechanism 9 (in a case where the probe 41 and the shoe 42 have the posture automatically orthogonal to the surface of the spot welding portion). FIG. 11 is a perspective view illustrating a state where the spot welding portion of a vehicle body V is inspected. Specifically, FIG. 11 illustrates a state where the articulated robot 100 enters the space in the vehicle cabin of the vehicle from a door opening portion of the vehicle body V and performs inspection of the spot welding portion of a reinforcement RF with respect to a floor panel FP.

In a state where the probe 41 and the shoe 42 have the posture orthogonal to the surface of the spot welding portion W as described above (refer to FIG. 9B), the projections 55 abut against the surface of the spot welding portion W, and thus the tip surface 42c of the shoe 42 does not directly abut against the surface of the spot welding portion W.

In a state where the tip surface 42c of the shoe 42 is allowed to face the surface of the spot welding portion W as described above, the operation signal is transmitted from the controller to the probe 41 through the signal cable 43. Then, the ultrasonic wave is oscillated by each of the piezoelectric vibrating elements being operated in the probe 41 in accordance with the operation signal. The oscillated ultrasonic wave is emitted to the spot welding portion W through the shoe 42. The ultrasonic wave is reflected by the end and bottom surfaces of each metal plate, and the defect part in a case where a welding defect is present, and each of the piezoelectric vibrating elements receives the reflection echo. The electric signal of the reflection echo received by each of the piezoelectric vibrating elements is transmitted to the controller through the signal cable 43. In the controller, the electric signal of the reflection echo is sent to the signal processing unit through the signal detection circuit and the parallel operation processing is performed by the signal processing unit as described above. As a result, whether the welding quality of the spot welding portion W as an inspection object is high or low is determined and the result of the determination is output. The output of the result of the determination is used for work in a post-process of the vehicle body production line.

As described above, in the present embodiment, the projections 55 disposed on the probe guides 5 abut against the surface of the spot welding portion W and the tip surface 42c of the shoe 42 does not directly abut against the surface of the spot welding portion W during the inspection performed in a state where the tip surface 42c of the shoe 42 faces the surface of the spot welding portion W. Accordingly, even when the above-described inspection is performed multiple times, wear of the tip surface 42c of the shoe 42 can be avoided, roughness or uneven wear of the tip surface 42c of the shoe 42 can be suppressed, and a very high level of inspection accuracy can be maintained. Therefore, the shoe 42 can be used over a long period of time, and the frequency of replacement of the shoe 42 can be significantly reduced or the necessity of replacement of the shoe 42 can be eliminated. The shoe 42 and the probe 41 can be given the posture orthogonal to the surface of the spot welding portion W by the floating mechanism 9. As a result, the projections 55 can be provided with a function to protect the shoe 42 (a function to prevent the shoe 42 from wearing by preventing the tip surface 42c of the shoe 42 from abutting against the surface of the spot welding portion W) and the function (the alignment function) to give the shoe 42 and the probe 41 the posture orthogonal to the surface of the spot welding portion W.

In the present embodiment, the inspection by the welding portion inspection device 1 is performed by the use of the articulated robot 100. In the welding portion inspection device according to the related art that is not provided with the probe guides 5, the shoe may abut against the surface of the spot welding portion at a relatively high speed in a case where the inspection is performed by the use of articulated robot 100 as described above. This occurs in a case where, for example, the teaching of the articulated robot is not properly performed. In this case, a situation arises in which concerns rise over damage to the shoe 42. In the present embodiment, in contrast, the tip surface 42c of the shoe 42 does not directly abut against the surface of the spot welding portion W by the probe guides 5 being provided with the projections 55, and thus damage to the shoe 42 can be suppressed even in a case where the teaching of the articulated robot 100 is not properly performed. In other words, the practicality of the automation of the welding portion inspection using the articulated robot 100 can be enhanced by the probe guides 5 being provided.

In the present embodiment, the lower surface 53c of the positioning unit 53b of the probe guide 5 abuts (is pressed) against the stopper surface 31b of the guide bracket 3 and the inclined surface 53d of the positioning unit 53b abuts (is pressed) against the inclined surface 31a of the guide bracket 3 due to the biasing force of the coil spring 7 in a case where no external force acts on the probe guide 5 and so on, and thus the ultrasonic inspection unit 4 is positioned in a state where the center lines of the probe 41 and the shoe 42 of the ultrasonic inspection unit 4 correspond to the center line O of the welding portion inspection device 1. Accordingly, the reproducibility of the teaching can be ensured well as the moving locus of the welding portion inspection device 1 moving as a result of the operation of the articulated robot 100 until the projections 55 abut against the surface of the spot welding portion W (in a situation in which no external force acts).

Figure 12A:
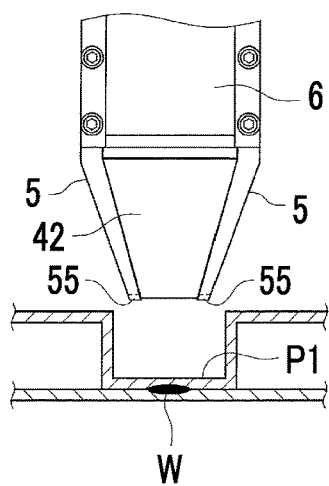
FIG. 12A is a diagram for showing a case where inspection by the welding portion inspection device is performed with respect to the spot welding portion positioned in a recessed portion in a vehicle body panel.
Figure 12B:
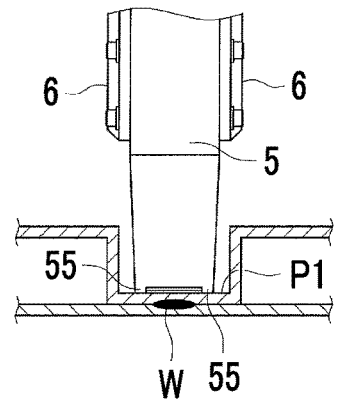
FIG. 12B is a diagram for showing the case where the inspection by the welding portion inspection device is performed with respect to the spot welding portion positioned in the recessed portion in the vehicle body panel.

As described above, the arm tip portion 101 of the articulated robot 100 that is adopted in the present embodiment is rotatable about the center line O of the welding portion inspection device 1. Accordingly, in a case where the spot welding portion W that is the inspection object is positioned in a recessed portion in a vehicle body panel, the welding portion inspection device 1 can be inserted into the recessed portion. In other words, as is apparent from FIGS. 2 and 3, the welding portion inspection device 1 according to the present embodiment has a relatively large X-direction dimension. Accordingly, in a case where the width dimension of a recessed portion P1 is smaller than the X-direction dimension of the welding portion inspection device 1 with the spot welding portion W that is the inspection object being positioned in the recessed portion P1 in the vehicle body panel as illustrated in FIG. 12A, for example, the Y direction with the smaller dimension than in the X direction is allowed to match the width direction of the recessed portion P1 as illustrated in FIG. 12B by the arm tip portion 101 of the articulated robot 100 being allowed to rotate by 90° from the state that is illustrated in FIG. 12A (by the welding portion inspection device 1 being rotated by 90° about the center line O by the rotation of the arm tip portion 101 resulting from the operation of the electric motor 102). As a result, the welding portion inspection device 1 can be inserted into the recessed portion P1 toward the spot welding portion W that is the inspection object. As described above, in the present embodiment, the inspection by the articulated robot 100 can be automated even with respect to the spot welding portion W that is present in a relatively narrow gap.

First Modification Example

A first modification example of the present disclosure will be described below. The shape of the tip part of the probe guide 5 according to the present modification example differs from that according to the embodiment described above. The rest of the configuration and the welding portion inspection operation are identical to those according to the embodiment described above. Therefore, solely the shape of the tip part of the probe guide 5 will be described below.

Figure 13:
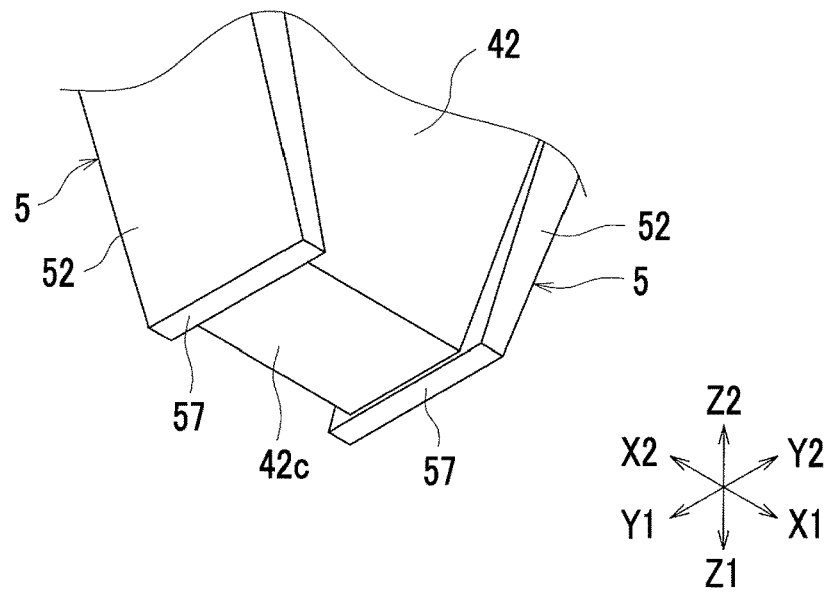
FIG. 13 is a diagram of a first modification example that corresponds to FIG. 7.

FIG. 13 is a perspective view of the tip parts of the shoe 42 and the probe guide 5 according to the present modification example. In this example, the entire lower end portion of the shoe guide portion 52 of the probe guide 5 is configured to be positioned closer to the lower side (the Z1 side) than the tip surface 42c of the shoe 42 as illustrated in FIG. 13. In other words, the entire lower end portion of the shoe guide portion 52 is flush, and the entire lower end portion of the shoe guide portion 52 is positioned to protrude beyond the tip surface 42c of the shoe 42. The protruding dimension of the lower end portion of the shoe guide portion 52 (a protruding dimension from the tip surface 42c of the shoe 42) corresponds to the protruding dimensions of the projections 55 according to the embodiment described above (that is the protruding dimension from the tip surface 42c of the shoe 42 as well). In the present modification example, the configuration of the present disclosure in which "the second part of the guide member protrudes beyond the tip surface of the sound propagation medium" is realized by the configuration described above.

In the configuration of the present modification example, the tip surface 42c of the shoe 42 does not directly abut against the surface of the spot welding portion W as in the case of the embodiment described above, and thus wear of the tip surface 42c of the shoe 42 can be avoided even when the inspection is performed multiple times. Accordingly, a very high level of inspection accuracy can be maintained. Therefore, the shoe 42 can be used over a long period of time, and the frequency of replacement of the shoe 42 can be significantly reduced or the necessity of replacement of the shoe 42 can be eliminated.

According to the configuration of the present modification example, the entire surface of a tip surface 57 of the shoe guide portion 52 fulfills the function of the projection 55 according to the embodiment described above, and thus a large contact area can be obtained with respect to the surface of the spot welding portion and the alignment function can be sufficiently obtained. The strength of the tip part of the shoe guide portion 52 can be ensured to a large extent, and damage to the shoe guide portion 52 can be prevented.

Second Modification Example

A second modification example of the present disclosure will be described below. The shapes of the shoe 42 and the probe guide 5 according to the present modification example differ from those according to the embodiment described above. The rest of the configuration and the welding portion inspection operation are identical to those according to the embodiment described above. Therefore, solely the shapes of the shoe 42 and the probe guide 5 will be described below.

Figure 14:
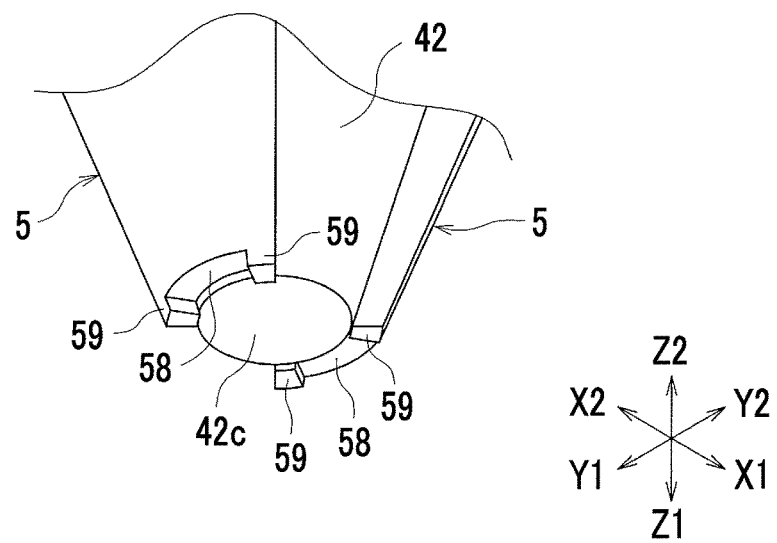
FIG. 14 is a diagram of a second modification example that corresponds to FIG. 7.

FIG. 14 is a perspective view of the tip parts of the shoe 42 and the probe guide 5 according to the present modification example. As illustrated in FIG. 14, the tip surface 42c of the shoe 42 according to this example has a circular shape. In other words, the shoe 42 has a truncated cone shape. Accordingly, each of the probe guides 5 has a shape covering the range of approximately one-fourth of the shoe 42 in the circumferential direction (90° in circumferential-direction angle), and projections 59 are disposed at both circumferential-direction end positions of a tip portion 58 of the probe guide 5 in this configuration. The protruding dimensions of the projections 59 correspond to the protruding dimensions of the projections 55 according to the embodiment described above. In the present modification example, the configuration of the present disclosure in which "the second part of the guide member protrudes beyond the tip surface of the sound propagation medium" is realized by the configuration described above.

In the configuration of the present modification example, the tip surface 42c of the shoe 42 does not directly abut against the surface of the spot welding portion W as in the case of the embodiment described above, and thus wear of the tip surface 42c of the shoe 42 can be avoided even when the inspection is performed multiple times. Accordingly, a very high level of inspection accuracy can be maintained. Therefore, the shoe 42 can be used over a long period of time, and the frequency of replacement of the shoe 42 can be significantly reduced or the necessity of replacement of the shoe 42 can be eliminated.

Other Embodiments

The present disclosure is not limited to the embodiment and each of the modification examples described above. Any modification or application can be applied to the present disclosure insofar as it is within the scope of claims and a scope equivalent to the scope of claims.

For example, the present disclosure can also be applied as a welding portion inspection device for inspecting the spot welding portion of any member other than the vehicle body of the vehicle although a case where the present disclosure is applied as the welding portion inspection device 1 for inspecting the spot welding portion of the vehicle body of the vehicle has been described in the embodiment and each of the modification examples described above.

In the embodiment and each of the modification examples described above, a case has been described where the present disclosure is applied as the welding portion inspection device 1 inspecting the spot welding portion W. However, the present disclosure is not limited thereto. The present disclosure can also be applied as a welding portion inspection device performing inspection of a welding portion resulting from another type of welding such as seam welding.

In the embodiment and each of the modification examples described above, a case has been described where the welding portion inspection device 1 is used after being attached to the arm tip portion 101 of the articulated robot 100. However, the present disclosure is not limited thereto. The present disclosure can also be used when the inspection of the spot welding portion W is performed by a worker grasping the welding portion inspection device 1.

In the embodiment and the second modification example described above, the projection 55 (59) is configured to be provided with the flat tip surface 55a. However, the present disclosure is not limited thereto. The projection may have a conical shape or a hemispherical shape as well.

In the embodiment and the second modification example described above, the number of the projections 55 (59) is four in total. However, the present disclosure is not limited thereto. A case where the number of the projections 55 (59) is three or at least five is also included in the technical scope of the present disclosure.

The present disclosure can be applied to a welding portion inspection device inspecting whether the welding quality of a spot welding portion is high or low.

What is claimed is:

1. A welding portion inspection device comprising:
a device body;
a probe configured to oscillate an ultrasonic wave and detect a reflected wave of the ultrasonic wave;
a sound propagation medium attached to a tip of the probe;
an elastic support mechanism configured to allow the probe and the sound propagation medium to be elastically supported to the device body; and
a guide member formed of a material higher in hardness than a hardness of a metal plate, the guide member including a first part and a plurality of second parts, the guide member being disposed such that the first part of the guide member is positioned on a side of the sound propagation medium and the plurality of second parts of the guide member protrude from the first beyond a tip surface of the sound propagation medium, the plurality of second parts of the guide member being disposed at outer sides of the sound propagation medium,
wherein the probe is configured to (i) oscillate the ultrasonic wave and emit the ultrasonic wave to a welding portion of the metal plate through the sound propagation medium, and (ii) perform inspection of the welding portion based on the detected reflected wave of the ultrasonic wave in a state where the tip surface of the sound propagation medium faces the welding portion.

2. The welding portion inspection device according to claim 1, wherein the plurality of second parts of the guide member are disposed in a plurality of locations in an outer edge portion of the guide member.

3. The welding portion inspection device according to claim 2, wherein:
the tip surface of the sound propagation medium has a rectangular shape; and
the plurality of second parts of the guide member are disposed at outer side positions respectively adjacent to four corner portions of the tip surface of the sound propagation medium.

4. The welding portion inspection device according to claim 1, further comprising an arm of an articulated robot, wherein:
the probe and the sound propagation medium are attached to a tip portion of the arm; and
the arm is configured to be operated such that the tip surface of the sound propagation medium faces the welding portion during the inspection of the welding portion.

5. The welding portion inspection device according to claim 1, further comprising a gel application device configured to apply gel to a surface of the welding portion by an amount larger than a capacity of a space formed between the tip surface of the sound propagation medium and the surface of the welding portion when the guide member abuts against the surface of the welding portion.

6. The welding portion inspection device according to claim 1, wherein:
the plurality of second parts of the guide member are disposed in a plurality of locations in an outer edge portion of the guide member; and
when one second part of the plurality of second parts of the guide member abuts against a surface of the welding portion, the elastic support mechanism is configured to elastically deform such that a posture of the probe and a posture of the sound propagation medium are changed so that all of the plurality of second parts abut against the surface of the welding portion.

7. The welding portion inspection device according to claim 1, wherein the elastic support mechanism includes a coil spring that is interposed between the device body and the guide member, and one end of the coil spring abuts against the guide member.

8. The welding portion inspection device according to claim 1, wherein the plurality of second parts of the guide member are integrally disposed on a tip of the first part.

9. The welding portion inspection device according to claim 1, wherein the plurality of second parts of the guide member protrude from a tip of the first part.

* * * * *